US009012561B2

(12) United States Patent
Fu et al.

(10) Patent No.: US 9,012,561 B2
(45) Date of Patent: *Apr. 21, 2015

(54) AQUEOUS COMPOSITIONS COMPRISING A BLEND OF EMULSION COPOLYMERS

(75) Inventors: Zhenwen Fu, Lansdale, PA (US); Andrew Hejl, North Wales, PA (US); Aurelia C. Sheppard, Newtown, PA (US); Andrew J. Swartz, Fleetwood, PA (US)

(73) Assignee: Rohm and Haas Company, Philadelphia, PA (US)

( * ) Notice: Subject to any disclaimer, the term of this patent is extended or adjusted under 35 U.S.C. 154(b) by 642 days.

This patent is subject to a terminal disclaimer.

(21) Appl. No.: 12/658,134

(22) Filed: Feb. 3, 2010

(65) Prior Publication Data

US 2010/0144937 A1 Jun. 10, 2010

Related U.S. Application Data

(63) Continuation-in-part of application No. 12/455,766, filed on Jun. 5, 2009.

(60) Provisional application No. 61/200,828, filed on Dec. 4, 2008.

(51) Int. Cl.

| C04B 24/26 | (2006.01) |
|---|---|
| C08F 283/00 | (2006.01) |
| C08G 18/42 | (2006.01) |
| C08J 3/00 | (2006.01) |
| C08J 3/02 | (2006.01) |
| C08K 3/20 | (2006.01) |
| C08K 5/00 | (2006.01) |
| C09B 67/00 | (2006.01) |
| C09D 5/02 | (2006.01) |
| A61L 15/62 | (2006.01) |
| B32B 27/28 | (2006.01) |
| C08F 236/12 | (2006.01) |
| C08G 18/28 | (2006.01) |
| C08K 5/06 | (2006.01) |
| C08K 5/09 | (2006.01) |
| C08K 5/10 | (2006.01) |
| C08K 5/11 | (2006.01) |
| C08K 5/12 | (2006.01) |
| C08K 5/52 | (2006.01) |
| C08K 5/101 | (2006.01) |
| C08L 91/00 | (2006.01) |
| C09D 11/02 | (2014.01) |
| C09J 7/02 | (2006.01) |
| H01B 3/30 | (2006.01) |
| C09D 133/08 | (2006.01) |
| C08L 33/06 | (2006.01) |
| C08L 33/08 | (2006.01) |
| C08L 33/10 | (2006.01) |
| C08L 33/12 | (2006.01) |
| C08L 35/00 | (2006.01) |
| C08L 35/06 | (2006.01) |
| C09D 133/06 | (2006.01) |

(Continued)

(52) U.S. Cl.
CPC ............ *C09D 133/08* (2013.01); *C08K 5/10* (2013.01); *C08K 5/20* (2013.01); *C08K 5/521* (2013.01); *C08L 33/06* (2013.01); *C08L 33/08* (2013.01); *C08L 33/10* (2013.01); *C08L 33/12* (2013.01); *C08L 35/00* (2013.01); *C08L 35/06* (2013.01); *C08L 2205/02* (2013.01); *C09D 133/06* (2013.01); *C09D 133/12* (2013.01); *C09D 151/003* (2013.01); *C09D 175/04* (2013.01)

(58) Field of Classification Search
CPC .. C08J 3/205; C08J 3/233306; C08J 2333/08; C08J 2333/10; C08J 2333/12; C08J 2433/06; C08J 2433/08; C08J 2433/10; C08J 2433/12; C08K 3/18; C08K 5/0016; C08K 5/06; C08K 5/10; C08K 5/101; C08K 5/20; C08K 5/521; C08L 33/06; C08L 33/08; C08L 33/10; C08L 33/12; C08L 35/00; C08L 35/06; C08L 2201/50; C08L 2201/52; C08L 2205/02; C09D 5/024; C09D 7/001; C09D 133/06; C09D 133/08; C09D 133/10; C09D 133/12; C09D 135/00; C09D 135/06; C09D 151/003
USPC ......... 524/457, 500, 501, 502, 145, 210, 284, 524/296, 297, 300, 306, 312, 313, 314, 315, 524/318, 366, 515, 523
See application file for complete search history.

(56) References Cited

U.S. PATENT DOCUMENTS

| 4,421,889 A | 12/1983 | Braun et al. | |
|---|---|---|---|
| 4,954,559 A * | 9/1990 | Den Hartog et al. | 524/507 |

(Continued)

FOREIGN PATENT DOCUMENTS

| EP | 1710284 | 10/2006 |
|---|---|---|
| GB | 1264428 | 2/1972 |

(Continued)

*Primary Examiner* — Patrick Niland
(74) *Attorney, Agent, or Firm* — Reid S. Willis

(57) ABSTRACT

The present invention provides compositions that enable excellent early hardness development in coating applications, the compositions comprising a blend of one or more acrylic emulsion copolymer, pA, having a Tg of 20° C. or higher, and one or more acrylic emulsion copolymer, pB, having a Tg at least 15° C. lower than that of pA, together with one or more additive chosen from a coalescent having a normal boiling point no greater than 300° C., a naturally derived plasticizer, and mixtures thereof. The compositions may be ambient curable.

6 Claims, No Drawings

(51) Int. Cl.
*C09D 133/12* (2006.01)
*C09D 151/00* (2006.01)
*C09D 175/04* (2006.01)
*C08K 5/20* (2006.01)
*C08K 5/521* (2006.01)

(56) References Cited

U.S. PATENT DOCUMENTS

| | | |
|---|---|---|
| 5,308,890 A | 5/1994 | Snyder |
| 5,344,675 A | 9/1994 | Snyder |
| 5,688,853 A | 11/1997 | Salter |
| 5,731,377 A | 3/1998 | Friel |
| 6,020,416 A | 2/2000 | Mazur |
| 6,174,960 B1 * | 1/2001 | Phan et al. .................... 525/191 |
| 6,420,474 B1 | 7/2002 | Carey |
| 2006/0211815 A1 * | 9/2006 | Licht et al. .................... 524/591 |

FOREIGN PATENT DOCUMENTS

| | | |
|---|---|---|
| WO | 2005/023947 A1 | 3/2005 |
| WO | WO 2007/109012 | 9/2007 |

* cited by examiner

AQUEOUS COMPOSITIONS COMPRISING A BLEND OF EMULSION COPOLYMERS

This application is a continuation-in part of and claims the benefit of priority under 35 U.S.C. §120 of U.S. nonprovisional patent application Ser. No. 12/455,766, filed on Jun. 17, 2009, and also claims the benefit of priority under 35 U.S.C. §119(e) of U.S. provisional patent application Ser. No. 61/200,828, filed on Dec. 4, 2008.

The present invention relates to aqueous compositions comprising a blend of two or more acrylic emulsion copolymers, in particular to aqueous compositions comprising a blend of one or more hard acrylic emulsion copolymer having a Tg greater than 20° C., and one or more soft acrylic emulsion copolymer having a Tg at least 15° C. lower than that of the hard copolymer, together with one or more coalescent having a normal boiling point of 300° C. or less, that are suitable for use in protective coatings, having a low level of volatile organic compounds (VOCs). Preferably, the soft copolymer has a Tg of less than 5° C.

Increasingly stringent policies and regulations for the protection of the environment have led to increased demand for protective coatings having a low VOC content. The requirement of low VOC coatings favors waterborne coatings over solvent-borne coatings, since the solvent would be a source of a large quantity of VOC. Aqueous coating compositions having low VOCs also provide reduced odor and toxicity. Aqueous coating compositions typically comprise water insoluble polymer particles dispersed in water. The latter are readily prepared from the free-radical polymerization of ethylenically unsaturated monomers, for example by emulsion polymerization. In order to function in a protective capacity, many types of coatings require some minimum hardness, which is predominantly controlled by the binder polymer. However, hard polymers dispersed in water are not usually film formers, meaning that, upon evaporation of the aqueous phase, the hard polymer particles fail to interdiffuse and remain essentially as discrete polymer particles. The resulting coating is brittle and lacks film integrity or toughness.

Conventional methods for producing low VOC coatings comprising organic polymer binders, such as those formed from the free-radical polymerization of ethylenically unsaturated monomers, include forming polymer compositions having glass transition temperatures (Tg) close to or well below ambient application conditions and combining them with low, if any, levels of coalescing solvents to effectively reduce the minimum film formation temperature of the coating composition. However, this approach produces coatings having inferior hardness properties, poor blocking resistance, poor soil resistance, and surface tack. Another common approach for producing low to zero VOC coatings combines polymers with Tgs well above ambient application conditions in combination with a nonvolatile or partially nonvolatile coalescent. Such coalescents may be added as separate ingredients during coating formulation; or they may comprise a polymer generated either during the polymerization of the binder, or generated separately. Coalescents are known to lower the overall Tg of the binder. However, this approach is problematic in both failing to develop early toughness (due to marginal film formation), and in failing to develop in a reasonable timeframe, if at all without baking, the desired hardness commensurate with the use of the high Tg (co)polymer. This is because under ambient conditions the coalescent fails to leave the film in an appropriate timeframe, for example 1-30 days. That is, hardness development is lacking, but, particularly, early hardness development. The latter is an important property in many end-use applications for both wood coatings and metal coatings, for example in applications requiring good early blocking resistance to avoid sticking of contacted painted surfaces, such as painted window frames contacting painted window casings, or where the coated articles need to be stacked for storage or transportation.

U.S. Pat. No. 5,688,853 discloses blends of soft and hard polymers intended to produce a lower overall Tg for the coating than that of the hard polymer, but this approach fails to produce a coating with a superior balance of both good early toughness development from good ambient temperature film formation, and superior hardness, early hardness development, blocking resistance, and soil resistance.

There remains a need for compositions suitable for use in coatings having a low level of VOCs, and which provide good ambient temperature film formation while at the same time providing a superior level of hardness, early hardness development, blocking resistance, and soil resistance, and with a low surface tack. The present inventors have endeavored to meet this remaining need.

Accordingly, the present invention provides compositions that achieve in use early development of toughness and hardness, the compositions comprising aqueous blends of one or more soft copolymer with one or more hard copolymer, each copolymer having as copolymerized units one or more acrylic or vinyl monomer, together with one or more coalescent having a normal boiling point of 300° C. or less.

The present invention provides an aqueous composition comprising: (a) a plurality of polymer particles (A) comprising one or more copolymer, pA, having weight average molecular weight greater than 100,000 and a glass transition temperature, Tg, of 20° C. or higher, as measured by differential scanning calorimetry, DSC; (b) a plurality of polymer particles (B) comprising one or more copolymer, pB, having weight average molecular weight greater than 5,000 and a glass transition temperature, Tg, as measured by differential scanning calorimetry, DSC, at least 15° C. lower than the Tg of pA; and (c) one or more additive to improve film formation chosen from: a coalescent having a normal boiling point no greater than 300° C. present in an amount of at least 4%, based on the total weight of solids of the copolymers pA and pB, a naturally derived plasticizer present in an amount of at least 0.5%, based on the total weight of solids of the copolymers pA and pB, and mixtures thereof; wherein the weight ratio of the copolymer solids of pA to the copolymer solids of pB is from 65/35 to 90/10, and further wherein said composition, when dried under ambient conditions, forms a film upon evaporation of water. In a preferred embodiment, the copolymer, pB, has weight average molecular weight greater than 100,000. In another preferred embodiment, the polymer particles B form a continuous pathway or phase through the film.

In one embodiment, either polymer particles A, or polymer particles B, or both, comprise a multistage emulsion polymer or a resin supported emulsion polymer (ReSEP polymer). In one such preferred embodiment, the one or more copolymer, pA, or the one or more copolymer, pB, referred to above is the dominant polymer stage, wherein the dominant polymer stage is a polymer that comprises 50% or more of the multistage polymer or the ReSEP polymer.

In another embodiment, the polymer particles B comprise a multistage emulsion polymer wherein at least one stage of the multistage emulsion polymer has a weight average molecular weight greater than 5,000, or preferably greater than 100,000, and a glass transition temperature, Tg, as measured by differential scanning calorimetry, DSC, at least 15° C. lower than the Tg of pA. In this embodiment, the polymer particles B may comprise at least one polymer stage having an acid monomer or anionic monomer content, in copolymerized form, of 10% or greater.

In yet another embodiment, the polymer particles B comprise a resin supported emulsion polymer wherein at least one stage of the resin supported emulsion polymer has a weight average molecular weight greater than 5,000, or preferably greater than 100,000, and a glass transition temperature, Tg, as measured by differential scanning calorimetry, DSC, at least 15° C. lower than the Tg of pA. In this embodiment, the polymer particles B may comprise at least one polymer stage having an acid monomer or anionic monomer content, in copolymerized form, of 10% or greater.

In one aspect of the invention, the copolymer pB, has weight average molecular weight greater than 5,000, or preferably greater than 100,000, and a glass transition temperature, Tg, as measured by differential scanning calorimetry, DSC, of 5° C. or lower.

The coalescent of the present invention may be chosen from diacid esters, phosphate esters, isobutyrate esters, alkyl esters of fatty acids, fatty ethers, fatty glycerides, fatty acid amides, alkoxylates of fatty acids, addition (co)polymer coalescents, and mixtures thereof. The amount of the coalescent may range from 4.0 wt. % to 30 wt. %, based on the total weight of solids of the copolymers pA and pB.

Alternatively, or in addition to the one or more coalescent, the compositions may comprise one or more naturally derived plasticizer chosen from animal-derived oil, fish-derived oil, plant-derived oil, alkyl esters thereof, glycerides thereof, and mixtures thereof. The amount of such plasticizer is at least 0.5 wt. %, and may range from 0.5 wt. % to 20 wt. %, based on the total weight of solids of the copolymers pA and pB, preferably 10 wt. % or less.

In a further embodiment, the present invention provides aqueous coating compositions comprising the inventive aqueous compositions and coatings made from the aqueous coating compositions. Thus, aqueous coatings made from the inventive compositions, and coated substrates are provided.

In still further another embodiment, the invention also provides aqueous coating compositions comprising the inventive aqueous compositions and coatings made from the aqueous coating compositions, wherein the Tg of the copolymer pA is greater than or equal to the drying temperature of the coating, and further wherein the Tg of the copolymer pB is at least 15° C. below the drying temperature of the coating.

Another embodiment of the invention provides aqueous compositions which, upon evaporation of the aqueous phase, produce a coating on a substrate, which coating exhibits an early hardness development of at least 15 seconds as measured by the difference between the coating hardness measured 7 days after coating the substrate and the coating hardness measured 1 day after coating the substrate, wherein the coating hardness is determined by the König pendulum hardness test, and wherein the coated substrate is maintained at ambient conditions for the duration of the 7 days.

Unless otherwise indicated, conditions of temperature and pressure are room temperature and standard pressure, also referred to herein as "ambient conditions". The coatings may be dried under conditions other than ambient conditions.

Unless otherwise indicated, any term containing parentheses refers, alternatively, to the whole term as if no parentheses were present and the term without that contained in the parentheses, and combinations of each alternative. Thus, the term "(meth)acrylate" means acrylate, methacrylate, or mixtures thereof, and, similarly, the term "(meth)acrylic" refers to any of acrylic, methacrylic, and mixtures thereof.

As used herein, the term "polymer" includes the term "copolymer", and, unless otherwise indicated, the term "copolymer" refers to polymers made from any two or more different monomers, e.g. terpolymers, pentapolymers etc., and homopolymers functionalized after polymerization so that two or more different functional groups are present in the product copolymer.

As used herein, unless otherwise indicated, the term "emulsion polymer" refers to a polymer made by emulsion polymerization.

As used herein, the term "resin supported emulsion polymer" refers to a polymer made by a resin supported emulsion polymerization. Elsewhere in the art, both terms are given the abbreviation "ReSEP". Herein, to avoid possible confusion between the two terms, a resin supported emulsion polymer is referred to as a ReSEP polymer, and a resin supported emulsion polymerization is referred to as a ReSEP polymerization.

As used herein, the term "naturally derived plasticizer" refers to animal-derived oil, fish-derived oil, plant-derived oil, alkyl esters thereof, glycerides thereof, and mixtures thereof.

As used herein, the term "acid monomer or anionic monomer" means ethylenically unsaturated carboxylic acid monomer in either the acid or anionic form.

As used herein, the term "ethylenically unsaturated carboxylic acid monomer" refers to acrylic acid, methacrylic acid, beta-acryloxypropionic acid, ethacrylic acid, α-chloroacrylic acid, α-vinylacrylic acid, crotonic acid, α-phenylacrylic acid, cinnamic acid, chlorocinnamic acid, β-styrylacrylic acid, maleic acid, itaconic acid, citraconic acid, and salts thereof.

As used in the claims and elsewhere herein, unless otherwise indicated, the phrase "glass transition temperature" or "Tg" refers to a measured Tg, determined by differential scanning calorimetry (DSC) using a heating rate of 10° C./minute, taking the mid-point in the heat flow versus temperature transition as the Tg value.

When described as a "Fox Tg", this refers to the calculated glass transition temperature of a (co)polymer as determined using the Fox equation (T. G. Fox, *Bull. Am. Physics Soc.*, Volume 1, Issue No. 3, page 123(1956)). So, to calculate the Fox Tg of a copolymer of monomers M1 and M2, $1/Tg=w(M1)/Tg(M1)+w(M2)/Tg(M2)$, wherein $w(M1)$ is the weight fraction of monomer M1 in the copolymer, $w(M2)$ is the weight fraction of monomer M2 in the copolymer, $Tg(M1)$ is the glass transition temperature of the high molecular weight homopolymer of M1, $Tg(M2)$ is the glass transition temperature of the high molecular weight homopolymer of M2, and all temperatures are in Kelvin. The Fox Tg is used herein only as a guideline.

As used herein, unless otherwise indicated, the term "molecular weight" refers to the weight average molecular weight of a (co)polymer as measured by gel permeation chromatography (GPC), as calibrated with a polystyrene standard. Gel permeation chromatography separates the members of a distribution of polymer chains according to their hydrodynamic size in solution rather than their molar mass. The system is then calibrated with standards of known molecular weight and composition to correlate elution time with molecular weight. The term "Mn" refers to the number average molecular weight of a (co)polymer as determined by GPC, as calibrated with a polystyrene standard. The techniques of GPC are discussed in detail in Modern Size Exclusion Chromatography, W. W. Yau, J. J Kirkland, D. D. Bly; Wiley-Interscience, 1979, and in A Guide to Materials Characterization and Chemical Analysis, J. P. Sibilia; VCH, 1988, p. 81-84.

As used herein, unless otherwise indicated, the term "normal boiling point" refers to the boiling point of a liquid at 760 mm/Hg.

The singular forms "a," "an," and "the" include plural referents unless the context clearly dictates otherwise. The endpoints of all ranges directed to the same component or property are inclusive of the endpoint and independently combinable.

The aqueous composition of the present invention enables achievement of early hardness and water resistance development of an applied film, such as by providing a thermoplastic system containing a blend of one or more vinyl or acrylic copolymer having Tg greater than 20° C., and one or more vinyl or acrylic copolymer having a Tg at least 15° C. lower than that of the hard copolymer, and preferably the soft copolymer Tg is less than 5° C., together with one or more coalescent having a normal boiling point of 300° C. or less.

The present invention utilizes the addition of a soft copolymer as a minority phase within a majority hard copolymer phase and produces films that possess much better early hardness development than films of the hard copolymer alone. This outcome is counterintuitive because, for example, blending two copolymers would be expected to produce, for a given property, a value for that property of the product that is intermediate between the two values for the respective constituent copolymers, although not necessarily a straight weighted average of the two values for the respective component copolymers according to the blend ratio. The result also runs contrary to logic because one would expect the addition of a softer component copolymer to a hard copolymer to produce a film that is softer than that resulting from the hard copolymer alone.

Without wishing to be bound by theory, it is believed that in films of hard copolymers alone, the addition of the soft polymer provides a pathway for the coalescent to escape and therefore allows the majority hard phase copolymer film to attain its theoretical maximum hardness. The lower the normal boiling point of the coalescent, the easier it is for the coalescent to diffuse and evaporate out of the film. Accordingly, to attain maximum hardness and early hardness development, the polymer film coating comprises a dominant hard polymer (high Tg, >20° C.) component to provide a maximum hardness attainable, a coalescent of normal boiling point <300° C. to aid in film formation of the dominant hard phase, a minority soft polymer component having a Tg at least 15° C. lower than that of the hard polymer (preferably having a Tg<5° C., more preferably <−15° C.) to provide a facile diffusion pathway for the coalescent, and a continuous pathway through the film provided by the soft polymer phase produced by the soft polymer particles in order to facilitate diffusion of the coalescent through the polymer film.

In one embodiment, a naturally derived plasticizer is used instead of or in addition to the coalescent, e.g. an animal- or fish- or plant-derived oil, or alkyl ester thereof, or glyceride thereof, and acts as either a penetrant (and moves into the substrate, such as wood or cement) or a reactive species (for example by an autoxidation process, the sites of unsaturation of the oil providing oxidative crosslinking sites within the film) as opposed to off-gassing into the air. Oils useful in this embodiment of the invention are described in United States Patent Application Publication Numbers US2004/0039095 (to Van de Mark, et al., see, for example, paragraphs [0040] to [0051]) and US2007/0101902 (to Frees, et al.; see, for example, paragraphs [0014] to [0016]). Suitable amounts of the plasticizer may be 0.5 wt. % or more, or 2 wt. % or more, or 5 wt. % or more, based on the total weight of the copolymers in the blend, and may range up to 30 wt. %, or less than 20 wt. %, or less than 10 wt. %. Preferably, the plasticizer is added in an amount of from 0.5% to 20%, more preferably from 0.5% to 10%, based on the total weight of solids of the copolymers in the blend.

The copolymers of the blend may be prepared from a wide range of polymerizable ethylenically unsaturated monomers, such as, for example, nonionic ethylenically unsaturated monomers, including α,β-monoethylenically unsaturated monomers, such as alkyl (meth)acrylates. Suitable nonionic ethylenically unsaturated monomers include arylenes, such as styrene, vinyl toluene, and α-methyl styrene; butadiene; olefins, such as, ethylene, propylene; vinyl esters, such as vinyl acetate, and vinyl versatate; vinyl halides, e.g. vinyl chloride; vinylidene chloride; (meth)acrylonitrile; $C_1$-$C_{40}$ alkyl esters of (meth)acrylic acid; for example, methyl(meth)acrylate, ethyl(meth)acrylate, n-butyl(meth)acrylate, 2-ethylhexyl(meth)acrylate, lauryl(meth)acrylate, and stearyl (meth)acrylate; other (meth)acrylates, such as benzyl(meth)acrylate, and phenyl(meth)acrylate; (poly)alkoxyalkyl(meth)acrylates, such as ethoxyethyl(meth)acrylate; and mono-, di-, tri-alkyl esters of ethylenically unsaturated di- and tri-carboxylic acids and anhydrides, such as ethyl maleate, dimethyl fumarate, and ethyl methyl itaconate.

Suitable polymerizable monomers may further include at least one multiethylenically unsaturated monomer. Examples of multiethylenically unsaturated monomers that may be used include allyl(meth)acrylates; glycol di(meth)acrylates, such as, ethylene glycol di(meth)acrylate, 1,6-hexanediol di(meth)acrylate, 1,3-butylene glycol di(meth)acrylate, polyalkylene glycol di(meth)acrylate; diallyl phthalate; polyol di- or tri-(meth)acrylates, such as trimethylolpropane tri(meth)acrylate; and aromatic di- and tri-vinyl monomers, such as, divinylbenzene, and divinyltoluene.

Optionally, the copolymer may further contain as polymerized units, ionic ethylenically unsaturated monomers such as amide containing monomers, such as (meth)acrylamide, and ethylenically unsaturated carboxylic acid monomers, such as (meth)acrylic acid. Acid monomers are often present, to some extent, in their deprotonated form, and so can also be referred to as anionic monomers. In one embodiment, suitable levels of ionic ethylenically unsaturated monomer may be in the range of 0 to 10 weight %, preferably 0.1 to 5 weight %, and more preferably 0.5 to 4 weight %, based on the dry weight of the polymer particles.

The copolymer of the present invention may optionally have one or more acid functional group chosen from a phosphorus acid-functional group, a polymeric side chain containing multi-acid functional groups, salts thereof, and combinations thereof. The phosphorus acid-functional group may be a (di)hydrogen phosphate group, phosphonate group, phosphinate group, alkali metal salt thereof, other salt thereof, or a combination thereof. The polymer may contain such acid functional groups at levels ranging from 0.1 to 15 wt. %, preferably, from 0.25 to 10 wt. %, and more preferably from 0.5 to 5 wt. %, based on the weight of the copolymer.

Suitable phosphorus acid group containing monomers may include, for example, dihydrogen phosphate functional monomers, such as (di)hydrogen phosphate esters of an alcohol containing a polymerizable vinyl or olefinic group, like allyl phosphate, mono- or diphosphate of bis(hydroxy-methyl)fumarate or itaconate, and phosphates of hydroxyalkyl (meth)acrylates including 2-hydroxyethyl(meth)acrylate, 3-hydroxypropyl(meth)acrylates. Other suitable monomers may include, for example, phosphonate functional monomers, like vinyl phosphonic acid, allyl phosphonic acid, α-phosphonostyrene, 2-(meth)acrylamido-2-methylpropanephosphonic acid. Further suitable monomers may have phosphinate groups, such as, for example, 1,2-ethylenically unsaturated (hydroxy)phosphinylalkyl(meth)acrylate monomers, like (hydroxy)-phosphinylmethyl methacrylate.

Preferred phosphorus acid monomers include phosphoethyl(meth)acrylate.

The copolymer may contain phosphorus acid-functional group containing monomer at levels in the range of 0.1 to 20 wt. %, preferably from 0.5 to 5 wt. %, and more preferably from 1 to 3 wt. %, based on the weight of the copolymer.

Alternatively, a polymer or a copolymer may be functionalized post-polymerization to give acid functional groups.

Acid functional groups may also include multi-acid functional groups that are formed from ethylenically unsaturated monomers and that contain multiple acid groups. The multi-acid functional groups may be incorporated into the polymer particle, for example, by including as polymerized units, a terminally unsaturated multiacid macromonomer.

Other suitable polymerizable monomers include functional monomers, for example, small amounts of adhesion-promoting monomers. Examples of such functional monomers include hydroxy-functional monomers, such as, 2-hydroxyethyl(meth)acrylate; amino-functional monomers, such as N,N'-dimethylaminoethyl(meth)acrylate; epoxy-functional monomers, such as glycidyl(meth)acrylate; keto-functional monomers, such as (meth)acrolein and diacetone (meth)acrylamide; autooxidizable monomers like acetoacetoxyalkyl(meth)acrylates, e.g. acetoacetoxyethyl (meth)acrylate, dicyclopentadienyl(meth)acrylate; isocyanate-functional monomers dimethyl metaisopropenyl benzyl isocyanate, isocyanato ethyl methacrylate; N-vinyl pyrrolidone; and polymerizable surfactants, including, but not limited to, Trem® LF-40 (Trem is a trademark of Henkel Corporation, King of Prussia, Pa.).

To limit the water sensitivity of the copolymer, the total amount of phosphorus acid, multi-acid, acid, hydroxyl, amine, ketone, aldehyde, aldol, keto-ester (acetoacetoxy), or aldimine group functional groups in the copolymer should not exceed 45 wt. %, or, alternatively, should not exceed 35 wt. %.

The copolymers of the hard component of the blend of the present invention may have a glass transition temperature (Tg) in the range of at least about 20° C., preferably at least 30° C., and more preferably at least 40° C. The hard copolymer Tg should range up to 90° C., or up to 80° C., or up to 70° C., or up to 60° C. The copolymer of the soft component of the blend of the present invention has a glass transition temperature (Tg) at least 15° C. lower than that of the hard copolymer component. In one embodiment, the Tg of the soft copolymer may be at least 30° C. lower than that of the hard copolymer, or at least 40° C. lower, or at least 50° C. lower, or even more than 75° C. lower. In one embodiment, the Tg of the soft copolymer may be in the range of not more than about 5° C., preferably not more than 0° C., more preferably not more than −15° C. or not more than −20° C., and most preferably not more than −25° C. The copolymer Tg should range as low as −80° C., or as low as −60° C., or as low as −50° C., or as low as −40° C. The weight ratio of the copolymer solids of pA to the copolymer solids of pB ranges from 65/35 to 90/10. In one embodiment, the ratio ranges from 70/30 to 90/10. Alternatively, the amount of hard copolymer in the blend may range from 65% hard copolymer, or 70%, or 75%, or 80% hard copolymer, upto an amount as high as 90% hard copolymer, or 85%, or 80%, or 75% hard copolymer.

The copolymers useful in the aqueous compositions of this invention may be prepared by any known process which provides copolymerization of ethylenically unsaturated monomers. Suitable processes include suspension or emulsion polymerization at known polymerization temperatures of from room temperature to about 90° C. which may be optimized for the catalyst system employed. The copolymers may have monomer compositions, particle sizes, and particle size distributions like those of polymeric latex binders prepared by standard emulsion polymerization techniques known in the art. In addition, the copolymers of the invention may have a unimodal or a multimodal, including a bimodal, particle size distribution.

Emulsion polymerization techniques for preparing an aqueous dispersion of the copolymers from ethylenically unsaturated monomers are well known in the polymer arts, and any conventional emulsion technique for preparing either or both of the blend components, including single stage processes and multiple stage polymerization processes, may be used. In the latter case, the preparation of the first stage polymer can be carried out by means of various techniques, such as solution polymerization, bulk polymerization or emulsion polymerization. Preferably emulsion polymerization is used. Either or both of the blend components may comprise a copolymer (i.e. a stage) with a high acid content, for example, greater than 20% acid monomer, or greater than 30%, or greater than 40%, and up to 70% acid monomer in the copolymer. Suitably, commercial high acid content polymers can be used as the first stage copolymer, either in the form of solids or in the form of the aqueous solutions of their salts. Examples of such polymers are commercialized under the trade names Morez or Morcryl (Rohm and Haas) or Joncryl (Johnson Polymer), for example Joncryl 678, Morez 101, and Morcryl 430+. The copolymers may be prepared using a seed polymer emulsion to control the number of particles produced by the emulsion polymerization of the polymer, as is known in the art. Preferably, the copolymers are prepared by polymerization in an aqueous medium.

A polymerization initiator may be used in carrying out the polymerization to form the polymer particles. Examples of polymerization initiators which may be employed include water-soluble and water-insoluble polymerization initiators which thermally decompose at the polymerization temperature to generate free radicals, such as persulfates, like ammonium or alkali metal (potassium, sodium, or lithium) persulfate; azo compounds, such as 2,2'-azobis(isobutyronitrile), 2,2'-azobis(2,4-dimethylvaleronitrile), and 1-t-butyl azocyanocyclohexane; hydroperoxides, such as t-butyl hydroperoxide and cumene hydroperoxide; peroxides such as, di-t-butyl peroxide; peresters such as t-butyl peracetate; as well as percarbonates, such as di(1-cyano-1-methylethyl)peroxy dicarbonate; and perphosphates.

Polymerization initiators may be used alone or as the oxidizing component of a redox system, which also includes a reducing component, such as ascorbic acid, malic acid, or lactic acid, or an alkali metal sulfite, for example, a hydrosulfite, hyposulfite, or metabisulfite, such as sodium hydrosulfite, potassium hyposulfite, and potassium metabisulfite, or sodium formaldehyde sulfoxylate. Examples of redox catalyst systems include t-butyl hydroperoxide/sodium formaldehyde sulfoxylate/Fe(II), and ammonium persulfate/sodium bisulfite/sodium hydrosulfite/Fe(II).

The initiator and the optional reducing component may be used in proportions from 0.001% to 5% each, based on the weight of the ethylenically unsaturated monomers in the monomer mixture to be polymerized.

Accelerators such as chloride and sulfate salts of cobalt, iron, nickel, or copper may be used in small amounts.

Chain transfer agents may optionally be used to control the molecular weight of the polymers. Examples of suitable chain transfer agents include mercaptans, polymercaptans, and polyhalogen compounds, including alkyl mercaptans such as ethyl mercaptan, n-butyl mercaptan, cyclohexyl mercaptan, and n-dodecyl mercaptan; alcohols such as isopropanol; halogenated compounds, such as trichlorobromoethane. Generally from 0 to 10% by weight, based on the weight of the ethylenically unsaturated monomers in the monomer mixture used to prepare the polymer particles, may be used. The polymer molecular weight may be controlled by other techniques known in the art, such as selecting the ratio of the initiator to ethylenically unsaturated monomer.

Aggregation of the copolymers may be discouraged by including a stabilizing surfactant in the polymerization mixture in the polymerization vessel. Many examples of surfactants suitable for emulsion polymerization are given in McCutcheon's Detergents and Emulsifiers (MC Publishing Co., Glen Rock, N.J.), published annually. Other types of stabilizing agents such as protective colloids, may also be used. For example, methyl cellulose and hydroxyethyl cellulose may be included in the polymerization mixture.

The copolymers may be prepared as an aqueous dispersion or suspension with a solids level of from 20 to 70 weight %, preferably in the range of from 35 to 60 wt. %.

The composition of the invention may include at least one coalescent which has a normal boiling point of 300° C. or less. Suitable coalescents may include any that have a boiling point of 300° C. or less and which comprise liquids or fluids under normal use conditions, for example, at ambient temperature. Examples of suitable coalescents are chosen from diacid esters, phosphate esters, isobutyrate esters, alkyl esters of fatty acids, fatty ethers, fatty glycerides, fatty acid amides, alkoxylates of fatty acids, addition (co)polymer coalescents, and mixtures thereof. Such coalescents, to the extent that they may have a boiling point of 300° C. or less and which comprise liquids or fluids under normal use conditions, may include, for example, alkyl, branched alkyl, aryl, oxygenated alkyl, or alkylaryl esters of diacids, such as adipic acids, succinic acids, for example, diethyl adipate; alkyl, oxygenated alkyl, and branched alkyl esters of isobutyrates e.g. 2,2,4-trimethyl-1,3-pentanediol monoisobutyrate (Texanol™, Eastman, Kingsport, Tenn.); alkyl, branched alkyl, oxygenated alkyl, or alkylaryl phosphate esters; alkyl or alkoxyalkyl esters of isobutyrates, such as for example, 2,2,4-Trimethyl-1,3-pentanediol diisobutyrate (Texanol™ isobutyrate) or TXIB™ (Eastman); and (branched) alkyl, alkylaryl or alkoxyalkyl esters, glycerides, amides and alkoxylates of fatty acids. In one embodiment of the invention, the coalescent may be added as an independent component during formulation of the composition of the invention.

Suitable total amounts of the coalescent will vary in proportion to the Tg of the copolymer, as more of the coalescent may be needed for a higher Tg copolymer. Suitable amounts of the coalescent may be 4 wt. % or more, or 5 wt. % or more, or 7 wt. % or more, or 10 wt. % or more, based on the total weight of the copolymers in the blend, and may range up to 30 wt. %, or less than 25 wt. %, or less than 20 wt. %. Preferably, the coalescent is added in an amount of from 5% to 20%, more preferably from 5% to 16%, or 10% to 16%, based on the total weight of solids of the copolymers in the blend.

The compositions of the invention are suitable for use in pigmented and unpigmented coating compositions for a variety of substrates such as metal, plastic, wood, and cementitious substrates, such as Portland cement based substrates, and natural stone. The compositions provide early property development of coating compositions containing blends of the polymer particles and coalescent of the invention. In formulating coating compositions, additives known in the art, such as external crosslinkers, e.g. diamines or polyamines, may be used.

EXAMPLES

These examples illustrate specific embodiments of the present invention. In the examples, the following abbreviations are used:

BA=butyl acrylate PEM[1]=phosphoethyl methacrylate

[1] Throughout the Examples, "PEM" refers to addition of a material that is 50% active strong acid phosphorus-containing monomer, phosphoethyl methacrylate.

MMA=methyl methacrylate STY=styrene
ALMA=allyl methacrylate EHA=2-ethylhexyl acrylate
AAEM=acetylacetoxy ethylmethacrylate
APS=ammonium persulfate
MAA=methacrylic acid tBHP=tertiary butyl hydroperoxide
AA=acrylic acid IAA=isoascorbic acid The following trademarks are used:

Rhoplex™ HG-31, Rhoplex™ WL-71 and Rhoplex™ 2438: Aqueous emulsion polymer dispersions, the Rohm and Haas Company, Philadelphia, Pa., USA.

Tamol™ 2001: A dispersant, Rohm and Haas Company, Philadelphia, Pa., USA.

Surfynol™ CT-111: A surfactant. Air Products Corporation, Allentown, Pa., USA.

Drewplus™ L-493: A defoamer. Ashland Chemical, Covington, Ky., USA.

TiPure™ R-706: A pigment. E.I. du Pont de Nemours and Company, Wilmington, Del., USA.

Texanol™: 2,2,4-Trimethyl-1,3-pentanediol monoisobutyrate, a coalescent. Eastman Chemical Co., Kingsport, Tenn., USA.

TXIB™: 2,2,4-Trimethyl-1,3-pentanediol diisobutyrate, a coalescent. Eastman Chemical Co., Kingsport, Tenn., USA.

Acrysol™ RM-8W and Acrysol™ RM-825: Thickeners. Rohm and Haas Company, Philadelphia, Pa., USA.

Zonyl™ FS-610: A surfactant, E.I. du Pont de Nemours and Company, Wilmington, Del., USA.

Exxate™ 1000 and Exxate™ 1200: Coalescents. Exxon Mobil Corporation, Irving, Tex., USA.

Triton X-405: Non-ionic surfactant. The Dow Chemical Company, Midland, Mich., USA.

Hard Acrylic Polymers (Tg>20° C.)

Representative hard polymers include Rhoplex™ HG-31 (DSC Tg=33° C.) and Rhoplex™ WL-71 (DSC Tg=43° C.), which are single-stage styrene-acrylics available from the Rohm and Haas Company; and Polymer A, prepared as described below.

Synthesis of Acrylic Polymer, Polymer A (Hard; Tg>20° C.)

A polymer having the composition 10 STY/30.5 EHA/51.3 MMA/5 AAEM/3.2 PEM was prepared as follows:

A monomer emulsion was prepared using 474 g DI water, 38.5 g (30.4% active) anionic surfactant, 195 g STY, 594 g EHA, 1000 g MMA, 97.5 g AAEM, and 62.4 g PEM. A five-liter, 4-neck round bottom flask containing an initial charge of 1360 g DI water and a solution of 37.4 g of anionic surfactant (30.4% active) in 32 g DI water, followed by a rinse of 26 g DI water, was heated to 87° C. under nitrogen sweep. An aliquot of monomer emulsion (63.7 g) was added to the flask along with a rinse of 42 g DI water, which was followed by the addition of a solution of 6.8 g APS in 42 g DI water and a rinse of 10 g DI water. After stirring for 5 min, the remaining monomer emulsion and a solution of 2.9 g APS in 79 g DI water were added separately to the flask over 120 min. The contents of the reaction flask were maintained at 86° C. during the addition of the monomer emulsion. When all the additions were complete, the monomer emulsion container was rinsed with 42 g DI water and the APS container was rinsed with 5 g of water, which were added to the reaction flask. The reaction flask was cooled to 70° C. and a catalyst/activator pair (tBHP/IAA) was added to lower residual monomer. The polymer was neutralized with aqueous ammonia (28%). The solid content was 45.0%. The Tg measured by DSC was 35° C.

Single-Stage Soft Acrylic Polymers (Tg<5° C.)

A series of single-stage emulsion polymers was prepared as follows (the calculated Fox Tg and measured DSC Tg of the polymers are given in Table 2 below):

Composition 1: A polymer dispersion having the composition 80 BA/16 MMA/4 AA was prepared as follows:

A monomer emulsion was prepared using 230 g DI water, 20.0 g anionic surfactant (31% active), 687 g BA, 137 g MMA, and 34.8 g AA. A 3-liter, 4 neck round bottom flask containing an initial charge of 534 g DI water, 5 g of anionic surfactant (31% active), followed by a rinse of 20 g of DI water, and a solution of 3.35 g sodium carbonate in 40 g DI water, was heated to 85° C. under nitrogen sweep. An aliquot of monomer emulsion (44.3 g) was added to the flask along with a rinse of 20 g DI water, which was followed by the addition of 1.6 g APS dissolved in 30 g of water. After stirring for 5 minutes, the remaining monomer emulsion and a solution of 1.1 g APS in 60 g water were added separately to the flask over 90 minutes. The temperature of the batch in the kettle was maintained at 85° C. during the addition. When all additions were complete, the monomer emulsion (ME) container was rinsed with 20 g DI water. A catalyst/activator pair was added after the ME feed was completed. The polymer was neutralized with aqueous ammonia (28%) to pH 8.0. The solids content was 45.0%.

Composition 2: A polymer dispersion having the composition 80 BA/14 MMA/6 AA was prepared in a similar manner to Composition 1 except the monomer emulsion was prepared using 230 g DI water, 25 g anionic surfactant (31% active), 687 g BA, 112 g MMA, and 51.0 g AA. The solids content was 44.4%.

Composition 3: A polymer dispersion having the composition 80 BA/18 MMA/2 AA was prepared in a similar manner to Composition 1 except the monomer emulsion was prepared using 230 g DI water, 25 g anionic surfactant (31% active), 687 g BA, 151 g MMA, and 16.9 g AA. The solids content was 44.6%.

Composition 4: A polymer dispersion having the composition 80 BA/16 MMA/4 MAA was prepared in a similar manner to Composition 1 except the monomer emulsion was prepared using 230 g DI water, 25 g anionic surfactant (31% active), 687 g BA, 138 g MMA, and 34.8 g MAA. The solids content was 44.3%.

Composition 5: A polymer dispersion having the composition 70 EHA/26 MMA/4 AA was prepared in a similar manner to Composition 1 except the monomer emulsion was prepared using 230 g DI water, 25 g anionic surfactant (31% active), 475 g EHA, 167 g MMA, and 26 g AA. During the polymerization, extra water was added to dilute a thick sample. The solids content was 42.4%.

Composition 6: A polymer dispersion having the composition 60 EHA/36 MMA/4 AA was prepared in a similar manner to Composition 1 except the monomer emulsion was prepared using 230 g DI water, 25 g anionic surfactant (31% active), 600 g EHA, 350 g MMA, and 39 g AA. During the polymerization, extra water was added to dilute a thick sample. The solids content was 42.2%.

Composition 7: A polymer dispersion having the composition 70 EHA/26 STY/4 AA was prepared in a similar manner to Composition 1 except the monomer emulsion was prepared using 230 g DI water, 25 g anionic surfactant (31% active), 475 g EHA, 167 g STY, and 26 g AA. During the polymerization, extra water was added to dilute a thick sample. The solids content was 39.7%.

Coating Formulation

Clear coatings (30% solids by weight) were prepared according to the recipes given below. The ratio of Polymer A (hard polymer) to example polymer (soft polymer) was held constant at 70/30 by weight of solids. For the control composition, the hard acrylic polymer (Polymer A; DSC Tg=35° C.) was kept at 100% (i.e. no soft polymer). The amount of texanol was held constant at 12% based on total polymer solids. The clear coating composition was formulated by additions of the formulation components shown below in Table 1 while stirring as practiced in the art.

TABLE 1

Clear Coating Formulation (Parts by weight, wet)

| Ingredient | Weight Added (g)[1] |
|---|---|
| Polymer A (Hard Polymer, 45% solids) | 46.67 |
| Example Polymer (Soft Polymer, 45% solids) | 20.00 |
| Water | 29.73 |
| Texanol ™ | 3.60 |
| Zonyl ™ FS-610 | 0.20 |
| Acrysol ™ RM-825 | 0.20 |

[1]Additions shown are wet weight of material; the hard-soft blend ratios are determined by polymer solids. The Example Soft Polymer in the Table has 45% solids (i.e. 9.0 g of solids). If a 50% solids soft polymer is used, the wet addition would be 18.0 g (9.0 g of solids) in order to preserve the soft-hard blend ratio. Quantities of water are adjusted to give 30% solids.

Film Hardness Testing

The film hardness of the clear coatings described herein was tested on dried coatings (thickness 1.5 mils+/−0.1 mils) obtained by applying the wet coating to aluminum panels using a Bird applicator and allowing to dry under constant temperature and humidity conditions (25° C., 50% RH). Hardness testing was measured via König pendulum damping (according to the ASTM method ANS/ISO 1522, 1998(E)) as a function of time after sample preparation using a Byk Mallinckrodt König Pendulum Hardness Tester. In the test, a pendulum below the horizontal substrate is connected via two contact points on the film surface and is started from a 6° angle to the vertical. The pendulum is effectively damped according to the softness of the film. The test records the time taken to reach the 3° angle to the vertical, so that higher values (in seconds) show a reduced susceptibility of the film to dampen the pendulum. Longer times therefore denote harder coatings.

Since the coating needs to film form properly in order to produce tough films, a low initial hardness can be acceptable. The key property is then early hardness development, such that the film on a coated surface or article can attain the desired property balance in a reasonable timeframe and be ready for its intended use. Early hardness development can be assessed by considering the difference between the 7-day hardness of the coating and the 1-day hardness of the coating. The desired hardness of the coating is dependent on the end-use application, however, preferably, the Hardness Development should be at least 15 Hardness Units (seconds), even more preferably at least 20 seconds, or at least 25 seconds, as measured by the difference in the 7-day and 1-day hardness test (König pendulum damping). Exemplary coating systems show Hardness Development of at least 50 seconds.

The effect of the soft polymer component on the coating hardness is shown in Table 2 below. Other than the control sample, which shows the hardness development for the hard polymer alone, the coating hardness is for the dried film of the 70/30 (hard/soft) polymer blend with Polymer A as the hard component, as described above.

The ME2 was added quickly to the kettle followed by a solution of iron(II) sulfate (0.02 g in 20 mL DI water), a solution of 1.30 g tBHP (70% active) dissolved in 15 g DI water, and a solution of 0.83 g isoascorbic acid (IAA) dissolved in 15 g DI water. When the reaction was complete, the reaction flask was cooled to 75° C. and a catalyst/activator

TABLE 2

Hardness of Clear Coatings of 70:30 Blend (Hard Polymer/Single-Stage Soft Polymer).

| Soft Component Composition | Composition of Soft Polymer Added | Soft Component Fox Tg (° C.) | Soft Component DSC Tg (° C.) | 1 day Hardness of Coating (sec) | 7 day Hardness of Coating (sec) | Hardness Develop. of Coating (sec) |
|---|---|---|---|---|---|---|
| Control | None (hard Polymer A) | — | — | 28.2 | 29.4 | 1.2 |
| 1 | 80BA/16MMA/4AA | −34 | −27 | 23.1 | 43.1 | 20.0 |
| 2 | 80BA/14MMA/6AA | −34 | −31 | 26.1 | 48.4 | 22.3 |
| 3 | 80BA/18MMA/2AA | −34 | −29 | 24.0 | 57.8 | 33.8 |
| 4 | 80BA/16MMA/4MAA | −33 | −26 | 16.1 | 41.3 | 25.2 |
| 5 | 70EHA/26MMA/4AA | −52 | −31 | 19.1 | 44.8 | 25.7 |
| 6 | 60EHA/36MMA/4AA | −38 | −15 | 21.9 | 23.6 | 1.7 |
| 7 | 70EHA/26STY/4AA | −52 | −32 | 11.0 | 14.9 | 3.9 |
| 8 | Rhoplex ™ 2438[1] | −38 | −19 | 16.0 | 34.5 | 18.5 |

[1]Rhoplex ™ 2438 is a single stage soft acrylic polymer, available from the Rohm and Haas Company; 50.5% solids; Fox Tg −38° C.; DSC Tg −19° C.

It can be seen that addition of a soft copolymer (Tg<5° C.) as a minor component of a hard-soft blend can have the effect of drastically improving early hardness development of the resulting film (over the first 7 days) compared to that for films of the hard component copolymer alone.

Two-Stage Soft Acrylics

Composition 9: A 2-stage emulsion polymer having the composition 90 (80 BA/18 MMA/2 AA)//10 (80 STY/20 AA) was prepared as follows:

A first monomer emulsion (ME1) was prepared using 391 g of DI water, 28.9 g of anionic surfactant (31% active), 648 g BA, 146 g MMA, and 16.2 g AA. A 3-liter, 4 neck round bottom flask containing an initial charge of 241 g DI water and 3.6 g of anionic surfactant (31% active) followed by a rinse of 30 g DI water was heated to 85° C. under nitrogen sweep. An aliquot of ME1 (45.0 g) was added to the flask along with a rinse of 10 g DI water, which was followed by the addition of a solution of 3.0 g APS in 20 g DI water and a rinse of 5 g DI water. After stirring for 5 minutes, the remaining ME1 and a solution of 2.0 g APS in 90 g DI water were added separately to the flask over 150 min. The contents of the reaction flask were maintained at 85° C. during the addition of the monomer emulsion. When addition of ME1 was complete the reaction was held for 15 min at 85° C. A second monomer emulsion (ME2) was prepared using 42.3 g DI water, 3.2 g of anionic surfactant (31% active), 72.0 g STY, and 18.0 g AA.

pair was added. The polymer was neutralized with aqueous ammonia (28% active). The solids content was 43.6%.

The effect of the 2-stage predominantly soft polymer (as the minor component of the 70/30 hard/soft blend) on the hardness of the hard polymer (Polymer A) is shown in Table 3 below. The clear coatings were formulated as described above (Table 1). The control sample in Table 3 shows the hardness development for the 100% hard polymer (no soft polymer).

TABLE 3

Hardness of Clear Coatings of 70:30 Blend (Hard Polymer/2-Stage Predominantly Soft Polymer).

| Soft Component Composition | Composition of Soft Polymer Added | Soft Component Fox Tg (° C.) | Soft Component DSC Tg (° C.) | 1 day Hardness of Coating (sec) | 7 day Hardness of Coating (sec) | Hardness Develop. of Coating (sec) |
|---|---|---|---|---|---|---|
| Control | None (hard polymer A) | — | — | 28.2 | 29.4 | 1.2 |
| 9 | 90(80BA/18MMA/2AA)// 10(80STY/20AA) | −25 | −23 | 21.7 | 54.6 | 32.9 |

Again, a significant improvement in early hardness development is seen when the predominantly soft 2-stage polymer is blended in as a minor component of a hard-soft blend with the hard polymer.

Resin Supported Emulsion Polymers

In a preferred embodiment, the soft polymer component is provided by a Resin Supported Emulsion Polymer (ReSEP). Compositions 10-15 are Examples of these ReSEP soft polymers. The calculated Fox Tg and measured DSC Tg of the soft component are given in Table 4 below.

Composition 10: A polymer dispersion having the composition 38(Morcryl 430+)/62(22 BA/22 STY/56 EHA) was prepared as follows:

A monomer mixture was prepared using 120 g BA, 120 g STY, and 305 g EHA. A 3-liter, 4 neck round bottom flask containing an initial charge of 300 g DI water, and 1035 g of Morcryl 430+, a high acid (>20%) copolymer dispersion (31.5% active), followed by a rinse of 30 g of DI water was heated to 81° C. under nitrogen sweep. A solution of 5.85 g APS dissolved in 25 g of water was added to the reaction. The monomer mixture was added to the flask over 100 minutes. The temperature of the batch in the kettle was maintained at 81° C. during the addition. When monomer addition was complete, the ME container was rinsed with 25 g DI water. A catalyst/activator pair was added after the monomer emulsion feed was completed. The solids content was 43.4%.

Composition 11: A polymer dispersion having the composition 38(Morcryl 430+)/62(22 BA/22 MMA/56 EHA) was prepared in a similar manner to Composition 10 except the monomer mixture was prepared using 120 g BA, 120 g MMA, and 305 g EHA. The solids content was 41.9%.

Composition 12: A polymer dispersion having the composition 38(Morcryl 430+)/62(44 BA/56 EHA) was prepared in a similar manner to Composition 10 except the monomer mixture was prepared using 239 g BA and 305 g EHA. 41.5%.solids content.

Composition 13: A polymer dispersion having the composition 38(Morcryl 430+)/62(44 MMA/56 EHA) was prepared in a similar manner to Composition 10 except the monomer mixture was prepared using 239 g MMA, and 305 g EHA. 41.3% solids.

Composition 14: A polymer dispersion having the composition 38(Morcryl 430+)/62(22 BA/50 STY/28 EHA) was prepared in a similar manner to Composition 10 except the monomer mixture was prepared using 120 g BA, 273 g STY, and 152 g EHA. The solids content was 41.5%.

Composition 15: A polymer dispersion having the composition 38(Morcryl 430+)/62(22 BA/10 STY/68 EHA) was prepared in a similar manner to Composition 10 except the monomer mixture was prepared using 165 g BA, 75 g STY, and 510 g EHA. The solids content was 41.6%.

The effect of the predominantly soft resin supported emulsion polymers (as the minor component of the 70/30 hard/soft blend) on the hardness of the hard polymer (Polymer A) is shown in Table 4 below. Again, the control sample shows the hardness development for the hard polymer alone. These clear coatings were formulated as described above (Table 1).

Again, addition of the predominantly soft ReSEP copolymers into the hard copolymer composition actually results in much greater hardness development for the 70/30 hard/soft blend than occurs for the hard polymer alone (with no soft component).

Effect of Coalescent Boiling Point

The effect of various coalescents (12% by weight based on total polymer solids) of different boiling point on the hardness development of clear films of the 70/30 hard/soft blends is shown in Table 5, below. These clear coatings were formulated as described above (Table 1) in the same quantities, except, additionally, aqueous ammonia (0.6 g, 14% solution) was used to neutralize the hard/soft blend.

TABLE 5

Effect of Coalescent on Hardness Development of 70/30 Blends.

| Coalescent | Boiling Point (° C.) | Hard/Soft Blend[1] Hardness (secs) | | Hardness Development |
|---|---|---|---|---|
| | | 1 Day | 7 Day | |
| Diethyl adipate | 250-252 | 29.4 | 152.1 | 122.7 |
| Exxate ™ 1200 | 240-285 | 43.4 | 151.2 | 121.8 |
| Texanol ™ | 255 | 40.1 | 124.1 | 84.0 |
| TXIB ™ | 280 | 42.0 | 118.5 | 76.5 |
| Dibutyl adipate | 305 | 14.0 | 14.9 | 0.9 |
| Dibutyl phthalate | 340 | 29.4 | 31.3 | 1.9 |

[1]Hard/Soft Blend is 70/30 blend of Polymer A (hard) and Composition 10 (soft).

It can be seen that the early hardness development for the hard-soft blends is critically dependent on the coalescent normal boiling point. Early hardness development is greatly improved for all of the coalescents with normal boiling point below 300° C., and, generally, optimum hardness is obtained more readily for the lower boiling point coalescents. However, coalescents with normal boiling point greater than 300° C. show essentially no improvement in hardness compared to films of the hard copolymer alone. If the coalescent remains trapped in the hard polymer phase, the hard copolymer film is unable to attain its maximum hardness while the coalescent is still present in the film. Addition of the soft polymer provides

TABLE 4

Hardness of Clear Coatings of 70:30 Blend
(Hard Polymer/Predominantly Soft Resin Supported Emulsion Polymer).

| Soft Component Composition | Composition of Soft Polymer Added | Soft Component Fox Tg (° C.) | Soft Component DSC Tg (° C.) | 1 day Hardness of Coating (sec) | 7 day Hardness of Coating (sec) | Hardness Develop. of Coating (sec) |
|---|---|---|---|---|---|---|
| Control | None (hard Polymer A) | — | — | 23.3 | 26.6 | 3.3 |
| 10 | 38(Morcryl 430+)/62 (22BA/22STY/56EHA) | −54 | −30 | 33.2 | 100.3 | 67.1 |
| 11 | 38(Morcryl 430+)/62 (22BA/22MMA/56EHA) | −54 | −38 | 25.2 | 88.2 | 53.0 |
| 12 | 38(Morcryl 430+)/62 (44BA/56EHA) | −73 | −56 | 23.3 | 112 | 88.7 |
| 13 | 38(Morcryl 430+)/62 (44MMA/56EHA) | −32 | −6 | 24.7 | 28.5 | 3.8 |
| 14 | 38(Morcryl 430+)/62 (22BA/50STY/28EHA) | −12 | +16 | 24.7 | 28 | 3.3 |
| 15 | 38(Morcryl 430+)/62 (22BA/10STY/68EHA) | −69 | −48 | 25.7 | 111 | 85.3 | a pathway for the coalescent to escape and therefore allows the majority hard phase copolymer film to attain its theoretical maximum hardness. The lower the normal boiling point of the coalescent, the easier it is for the coalescent to diffuse and evaporate out of the film.

Hardness as a Function of Soft Copolymer Content

Table 6, below, shows hardness as a function of the percentage of soft polymer (Composition 10) in a hard/soft blend, and appears to show that the escape of coalescent from the film is dependent on the presence of some minimum amount of soft copolymer particles. Polymer A is the hard polymer and Exxate 1000 is the coalescent, added at a level of 15% in each case (based on the weight of total polymer solids in the blend). Exxate 1000 has a normal boiling point in the range of 220-250° C.

TABLE 6

Hardness as a Function of the Percentage of Soft Polymer (Composition 10) in the Blend, and Exxate 1000 as the Coalescent.

|  | Ex 1 | Ex 2 | Ex 3 | Ex 4 | Ex 5 | Ex 6 | Ex 7 |
|---|---|---|---|---|---|---|---|
| Polymer A | 66.67 | 60.00 | 53.33 | 46.67 | 40.00 | 33.33 | 0.00 |
| Composition 10 | 0.00 | 7.14 | 14.29 | 21.43 | 28.57 | 35.71 | 71.43 |
| Aq. Ammonia (14%) | 0.00 | 0.20 | 0.40 | 0.60 | 0.80 | 1.00 | 2.00 |
| % Soft Acrylic | 0% | 10% | 20% | 30% | 40% | 50% | 100% |
| Hardness (7 Day) | 36.4 | 35.5 | 54.6 | 159.1 | 147.0 | 125.1 | 70.5 |

It can be seen that there is no appreciable hardness development for levels of the soft copolymer as low as 10% in the hard/soft blend. However, there is significant hardness development seen for levels of soft component of 20% in this system where the Exxate 1000 coalescent has a large effect in softening the hard component (which may be required for adequate film formation and toughness). Hardness development is very large for levels of 30% or more of the soft component in the hard/soft blend.

Similarly, Table 7, below, shows hardness as a function of the percentage of soft polymer (Composition 10) in a hard/soft polymer blend with Polymer A as the hard polymer, and Texanol as the coalescent, added at a level of 12% in each case (based on the weight of total polymer solids in the blend).

TABLE 7

Hardness as a Function of the Percentage of Soft Polymer (Composition 10) in the Blend and Texanol as the coalescent.

|  | Ex 1 | Ex 2 | Ex 3 | Ex 4 | Ex 5 |
|---|---|---|---|---|---|
| Polymer A | 66.67 | 53.33 | 50.00 | 46.67 | 43.33 |
| Composition 10 | 0.00 | 14.29 | 17.86 | 21.43 | 25.00 |
| Aqueous Ammonia (14%) | 0.00 | 0.40 | 0.50 | 0.60 | 0.70 |
| % Soft Acrylic | 0% | 20% | 25% | 30% | 32% |
| Pendulum Hardness 1 day | 32.7 | 33.1 | 35.0 | 42.9 | 40.6 |
| Pendulum Hardness 7 day | 40.6 | 42.9 | 58.8 | 120.9 | 106.9 |
| Hardness Development (1 day to 7 day) | 6.9 | 9.8 | 23.8 | 77.9 | 66.3 |

The results in Table 7, showing hardness as a function of % soft polymer in the blend using Texanol as the coalescent, are essentially the same as those seen in Table 6 using Exxate 1000 as the coalescent. In this case (Table 7), early hardness development is seen at levels of 25% soft copolymer in the blend. In fact, continuous pathways of soft copolymer through the film appear at levels of approximately 20-25% soft copolymer and above, see Table 8 (below) with the threshold concentration of soft copolymer depending on the type of packing adopted by the polymer particles, (and modified therefrom by variables including their respective particle sizes).

TABLE 8

Site Percolation Threshold[1] for 2-Component System (Hard/Soft Blend)

| Lattice Structure (Packing) | Site Percolation Threshold |
|---|---|
| Simple Cubic | 31.2% |
| Body-Centered Cubic (BCC) | 24.6% |
| Face-Centered Cubic (FCC) | 19.9% |
| Hexagonal Closest Packed (HCP) | 19.9% |

[1]Minimum packing density in a 2-component blend that leads to formation of diffusion pathways. See: "Introduction to Percolation Theory", 2nd Ed., page 17, D. Stauffer and A. Aharony, 1991, Taylor & Francis, Inc., Washington, D.C., USA.

The most common type of lattice structure adopted by latex polymer particles of similar particle size, upon evaporation of the aqueous phase and prior to film formation, is expected to be a close packed lattice structure with similar threshold concentration to form pathways to those of BCC, FCC and HCP in Table 8. For a soft component with smaller particle size relative to the hard component particles, the threshold amount of soft copolymer to form pathways for diffusion can be lower than those shown in Table 8. In the soft/hard blends of the invention, it is important that the soft component forms a pathway through the film in order to enhance the diffusion and evaporation rate of the coalescent.

Hardness Development for 70/30 Hard/Soft Blends

The greater early hardness development achieved by co-blending a minority soft component has been found to be a general phenomenon for hard acrylic copolymers. Tables 9 and 10 illustrate further examples in which the 70/30 hard/soft blends are formulated as before (Table 1), but using 10.5% by weight Texanol for HG-31 (Table 9) and 16% by weight Texanol for WL-71 (Table 10), in both cases based on total polymer solids.

TABLE 9

Hardness Development for HG-31 Hard Polymer and 70/30 Blend

| Ingredient | Hard Polymer | Hard/Soft Blend |
|---|---|---|
| HG-31 [1] | 66.67 | 46.67 |
| Composition 10 | 0 | 21.43 |
| Texanol | 3.15 | 3.15 |
| 1 day Hardness | 14.5 | 32.7 |
| 7 day Hardness | 15.4 | 52.7 |
| Hardness Development | 0.9 | 20.0 |

[1] HG-31 is 45.0% solids; Fox Tg 8° C.; DSC Tg 33° C.

TABLE 10

Hardness Development for WL-71 Hard Polymer and 70/30 Blend

| Ingredient | Hard Polymer | Hard/Soft Blend |
|---|---|---|
| WL-71 [1] | 72.64 | 50.85 |
| Composition 10 | 0 | 21.43 |
| Texanol | 4.80 | 4.80 |
| 1 day Hardness | 52.3 | 54.6 |
| 7 day Hardness | 61.6 | 97.1 |
| Hardness Development | 9.3 | 42.5 |

[1] WL-71 is 41.3% solids; Fox Tg 17° C.; DSC Tg 43° C.

Comparative Blend

For comparison, hardness development was studied for the 65/35 hard/soft blend of polymers as described in U.S. Pat.

No. 5,688,853 (Salter; Example 15). Two polymers were prepared based on Examples 1A and 1B of that patent such that the polymer compositions were equivalent to Example 1A (with Fox Tg −15° C.) and Example 1B (with Fox Tg of +70° C.). The syntheses, described below, follow the patent as closely as practicable, although a structurally similar ureido adhesion promoting monomer was substituted for that of the patent, and, additionally, the fatty acid nonionic surfactant was replaced in Example 1A with similar non-ionic surfactants (Triton X-405) and in Example 1B with FES-32 and Triton X-405.

Synthesis of Salter Example 1A, Fox Tg −15° C.

A monomer emulsion was prepared using 1339 g DI water, 116 g Triton X-405 nonionic surfactant (70% active), 1034 g BA, 619 g MMA, and 33.3 g ureido adhesion promoting monomer (50% active). A five-liter, 4-neck round bottom flask containing an initial charge of 395 g DI water and 64.0 g Triton X-405 nonionic surfactant (70% active) was heated, with stirring, to 70° C. under nitrogen sweep. A mixture of 13.6 g t-butyl peroxybenzoate, a trace amount of hydrochloric acid (30% active), and 43.7 g DI water was added to the flask. A solution of 0.32 g FeSO4, 0.16 g Versene and 20 g DI water was added to the flask. A reductant solution of 6.7 g isoascorbic acid, 3.0 g sodium hydroxide (50% active) and 260 g DI water was prepared separately. The monomer emulsion and activator solutions were fed to the reaction flask in 3 stages. In stage 1, 11.5% of the monomer emulsion and reductant solution were added over 50 min. In stage 2, 21.5% of the monomer emulsion and reductant solution were added over 45 min. In stage 3, the remaining 67% of the monomer emulsion and reductant solution were added over 120 min. The contents of the reaction flask were maintained at 70° C., with stirring, during the feeding of all three stages. When the feeds were complete, the monomer emulsion container was rinsed with 20 g DI water, which was added to the reaction flask. The contents of the reaction flask were cooled to 60° C. and a catalyst/activator pair was added. The solids content was 44.1%. The Tg of this polymer measured by DSC was −10° C.

Synthesis of Salter Example 1B, Fox Tg +70° C.

A monomer emulsion was prepared using 1339 g DI water, 53.8 g anionic surfactant (31% active), 233 g BA, 1405 g MMA, 16.9 g MAA, and 33.3 g ureido adhesion promoting monomer (50% active). A five-liter, 4-neck round bottom flask containing an initial charge of 395 g DI water and 26.9 g anionic surfactant (31% active) was heated, with stirring, to 70° C. under nitrogen sweep. A mixture of 13.6 g t-butyl peroxybenzoate, a trace amount of hydrochloric acid (30% active), and 43.7 g DI water was added to the flask. A solution of 0.032 g FeSO4, 0.016 g nitrilotriacetic acid trisodium salt and 32 g DI water was added to the flask. A reductant solution of 6.7 g isoascorbic acid, 10.3 g sodium carbonate and 260 g DI water was prepared separately. The monomer emulsion and activator solutions were fed to the reaction flask in 3 stages. In stage 1, 11.5% of the monomer emulsion and reductant solution were added over 50 min. In stage 2, 21.5% of the monomer emulsion and reductant solution were added over 45 min. In stage 3, the remaining 67% of the monomer emulsion and reductant solution were added over 120 min. The contents of the reaction flask were maintained at 70° C., with stirring, during the feeding of all three stages. When the feeds were complete, the monomer emulsion container was rinsed with 20 g DI water, which was added to the reaction flask. The contents of the reaction flask were cooled to 60° C. and a catalyst/activator pair was added. The polymer was neutralized with aqueous ammonia. The solids content was 42.8%. The Tg of this polymer measured by DSC was +73° C.

The copolymer compositions used in the comparative blend study are shown below in Table 11.

TABLE 11

Blend components for Comparative Blend

| Example | Fox Tg | Composition | DSC Tg | % Solids |
|---|---|---|---|---|
| 1A | −15 | 62BA/37MMA/1adh. promoter | −10° C. | 44.1 |
| 1B | +70 | 14BA/84MMA/1MAA/ 1adh. promoter | +73° C. | 42.8 |

Coating Formulation

Clear coatings (30% solids) were prepared according to the recipes given below, Table 12. The ratio of Polymer 1B to Polymer 1A was held constant at 65/35 by weight of solids. The amount of texanol was 2.5% based on total polymer solids.

TABLE 12

Example Coating Composition (parts by weight, wet, in grams)

| Ingredient | Weight |
|---|---|
| Example 1A | 47.46 |
| Example 1B | 26.54 |
| Water | 23.50 |
| Texanol ™ | 0.81 |
| Triton ™ X-405 (70%) | 1.74 |
| Zonyl ™ FS-610 | 0.20 |
| Acrysol ™ RM-825 | 0.32 |

Coating Hardness

Film hardness of the clear coatings was tested on dried coatings (thickness 1.5 mils +/−0.1 mil) on aluminum panels as described above. Hardness testing was measured, as above, via König pendulum damping (according to the ASTM method ANS/ISO 1522, 1998(E)) as a function of time after sample preparation, Table 13.

TABLE 13

Hardness Development for Comparative 65/35 Blend

| Texanol Level | 1 Day Hardness | 7 Day Hardness | Hardness Development (Difference 1 day to 7 day) |
|---|---|---|---|
| 2.5% | 34.1 | 45.7 | 11.7 |

The hardness development is not sufficient for commercial use in hard coatings.

Pigmented Systems

Paints formulated with a hard polymer (Paint A) and paints formulated with a blend of a hard polymer and a soft polymer (Paint B) were prepared in order to assess the effectiveness of hardness development in pigmented systems. The titanium dioxide (TiO2) pigment dispersion below, Table 14, was used in formulating Paints A and B (Table 15).

TABLE 14

Composition of TiO2 Dispersion (parts by weight, wet, in grams)

| Ingredient | Parts by Weight |
| --- | --- |
| Water | 24.0 |
| Tamol ™ 2001 dispersant | 3.76 |
| Surfynol ™ CT-111 | 1.0 |
| Aqueous ammonia (28%) | 1.0 |
| Drewplus ™ L-493 | 0.5 |
| TiPure ™ R-706 | 105.2 |

Paints A and B were formulated as shown below in Table 15, which also shows hardness development and block resistance data for the paints. Hardness development testing was performed as previously described above.

Block resistance tests were performed according to the American Standard Test Method for Blocking Resistance of Architectural Paints, ASTM D4946-89 (outlined below). Blocking refers to the tendency of painted surfaces to stick together (block) when stacked or placed in contact with each other under pressure. The block resistance test simulates, for example, the sticking effect of closing a newly painted window frame so that it contacts a newly painted window casing. It is reported on a 0-10 scale, which is used to evaluate the "tack" (the noise produced upon separation of blocked surfaces) and the degree of "seal" (the physical damage to a paint film caused by the separation of blocked surfaces. Thus, a block resistance of 10 would mean that there is no tendency to stick at all and no tack.

Block Resistance Test 8 to 10 ml of the paint was transferred on to a Leneta test chart in front of the drawdown bar (3 Mil Bird Film Applicator). Immediately, grasping the drawdown bar with both hands, a smooth paint film was drawn over the test chart at a rate of about 0.2 ft per sec (5 sec per test chart). The film was allowed to cure in a horizontal position in a constant temperature room (CTR) at 25° C. and 50% relative humidity for a specified period of time depending on the test requirement (1 day or 7 days). Four 1½"×1½" sections (to run duplicates) of each type of paint film were prepared. The cut sections were placed with the paint surfaces face to face and then placed on a flat metal plate. Each individual specimen was topped with a number 8 rubber stopper, with narrow side down, and a 1000 g. weight was placed on each stopper. The block resistance of each paint was evaluated under 2 sets of conditions. These are for face-to-face contact for: (i) 24 hours at room temperature, and (ii) 30 minutes at 50° C. In all cases, the weights and stoppers were equilibrated under the test conditions prior to testing. After the test period, the stoppers and weights were removed and the sections separated with slow and steady force at an angle of approximately 180°. The samples were then rated for block resistance on a scale of 0 to 10 as described below:

10=no tack, perfect
9=trace tack, excellent
8=slight tack, very good
7=slight tack, good
6=moderate tack, good
5=moderate tack, fair
4=severe tack, no seal, fair
3=5-25% seal, poor
2=25-50% seal, poor
1=50-75% seal, poor
0=complete seal, very poor tack The data for Paints A and B are shown below in Table 15.

TABLE 15

Paint Formulations, Pendulum Hardness and Block Resistance

| Ingredient | Paint A | Paint B |
| --- | --- | --- |
| Polymer A (Hard) | 254.78 | 195.26 |
| Composition 10 (Soft) | — | 87.77 |
| Water | 98.56 | 72 |
| Aqueous ammonia (28%) | 0 | 2.9 |
| TiO2 dispersion (Table 14) | 135.43 | 135.43 |
| Texanol ™ | 18.65 | 13.21 |
| Acrysol ™ RM-8W | 1.9 | 1.95 |
| 1 day Hardness (sec) | 20 | 48 |
| 7 days Hardness (sec) | 25 | 109 |
| Hardness Development | 5 | 61 |
| Block Resistance (Leneta Chart, 3 mil Bird) | | |
| 1 Day Drying Block Test: ½ hour at room temp. | 10 | 10 |
| 1 Day Drying Block Test: ½ hour in 50° C. oven | 0 | 8 |
| 1 Day Drying Block Test: 24 hours at room temp. | 0 | 10 |
| 7 Days Drying Block Test: ½ hour at room temp. | 10 | 10 |
| 7 Days Drying Block Test: ½ hour in 50° C. oven | 0 | 10 |
| 7 Days Drying Block Test: 24 hours at room temp. | 4 | 10 |

It can be seen that Paint B comprising the hard-soft blend of polymers shows much better hardness development than Paint A, which comprises just the hard polymer as the binder. Paint A fails to attain any significant hardness. Additionally, Paint B shows perfect block resistance under most test conditions (score of 10; no difficulty separating, and no tack at all), and is almost perfect (score of 8) under even the most demanding test (minimal cure time of just 1 day at room temperature before contacting the paint surfaces together for 30 mins at 50° C.), whereas Paint A shows major problems with respect to block and fails the test under most test conditions.

The invention claimed is:

1. An aqueous composition comprising:
a plurality of hard acrylic copolymer particles having a weight average molecular weight greater than 100,000 and a glass transition temperature, $T_g$, of at least 30° C., as measured by differential scanning calorimetry, DSC;
a plurality of soft acrylic copolymer particles having a weight average molecular weight greater than 5,000 and a glass transition temperature, $T_g$, of 0° C. to −80° C. as measured by differential scanning calorimetry, DSC; and
a coalescent having a normal boiling point no greater than 300° C. and present in an amount of from 4% to 30% by weight, based on the total weight of solids of the copolymers or a naturally derived plasticizer present in an amount of at least 0.5%, based on the total weight of solids of the copolymers;
wherein the weight ratio of the hard acrylic copolymer solids to the soft acrylic copolymer solids is from 65/35 to 90/10.

2. The aqueous composition of claim 1, wherein the composition, when applied to a substrate and dried under ambient conditions, forms a film upon evaporation of water, wherein the soft acrylic copolymer particles form a continuous pathway through the film.

3. The aqueous composition according to claim 1, wherein the coalescent is chosen from: diacid esters, phosphate esters, isobutyrate esters, alkyl esters of fatty acids, fatty ethers, fatty glycerides, fatty acid amides, alkoxylates of fatty acids, addition (co)polymer coalescents, and mixtures thereof.

4. The aqueous composition according to claim 1, wherein the naturally derived plasticizer is chosen from: animal-derived oil, fish-derived oil, plant-derived oil, alkyl esters thereof, glycerides thereof, and mixtures thereof.

5. The aqueous composition of claim 1 which, when applied to a substrate and dried under ambient conditions, forms a film upon evaporation of water that exhibits an early hardness development of at least 15 seconds as measured by the difference between the coating hardness measured 7 days after coating the substrate and the coating hardness measured 1 day after coating the substrate, when the coating hardness is determined by the König pendulum hardness test, and when the coated substrate is maintained at ambient conditions for the duration of the 7 days.

6. An aqueous composition comprising:

a plurality of hard acrylic copolymer particles having a weight average molecular weight greater than 100,000 and a glass transition temperature, $T_g$, of at least 30° C. to 90° C., as measured by differential scanning calorimetry, DSC;

a plurality of soft acrylic copolymer particles having a weight average molecular weight greater than 5,000 and a glass transition temperature, $T_g$, of 0° C. to −80° C. as measured by differential scanning calorimetry, DSC; and a coalescent having a normal boiling point no greater than 300° C. and present in an amount of from 4% to 30% by weight, based on the total weight of solids of the copolymers or a naturally derived plasticizer present in an amount of at least 0.5%, based on the total weight of solids of the copolymers;

wherein the weight ratio of the hard acrylic copolymer solids to the soft acrylic copolymer solids is from 65/35 to 90/10; and wherein the composition, when applied to a substrate and dried under ambient conditions, forms a film upon evaporation of water that exhibits an early hardness development of at least 15 seconds as measured by the difference between the coating hardness measured 7 days after coating the substrate and the coating hardness measured 1 day after coating the substrate, when the coating hardness is determined by the König pendulum hardness test, and when the coated substrate is maintained at ambient conditions for the duration of the 7 days.

* * * * *